United States Patent [19]

Summers et al.

[11] Patent Number: 4,553,742

[45] Date of Patent: Nov. 19, 1985

[54] APPARATUS FOR GENERATING A REDUCING GAS

[75] Inventors: Frank V. Summers; David C. Meissner; Ronald Brown, all of Charlotte, N.C.

[73] Assignee: Midrex International BV Rotterdam, Zurich Branch, Zurich, Switzerland

[21] Appl. No.: 659,109

[22] Filed: Oct. 9, 1984

Related U.S. Application Data

[60] Division of Ser. No. 556,502, Dec. 1, 1983, which is a continuation-in-part of Ser. No. 360,713, Mar. 22, 1982, abandoned.

[51] Int. Cl.$^4$ ............................................. F27B 19/04
[52] U.S. Cl. .......................................... 266/156; 48/92
[58] Field of Search .................... 266/144, 156; 48/92

[56] References Cited

U.S. PATENT DOCUMENTS 3,853,538 12/1974 Nemeth .................................. 75/35
4,412,858 11/1983 Viramontes-Brown et al. ...... 75/38

FOREIGN PATENT DOCUMENTS 2078779 1/1982 United Kingdom .................... 75/29

Primary Examiner—Melvyn J. Andrews
Attorney, Agent, or Firm—Ralph H. Dougherty

[57] ABSTRACT

Apparatus for generating a reducing gas in a molten iron bath gasifier while simultaneously producing direct reduced iron oxide in an associated shaft furnace with the gas from the gasifier. The apparatus includes means for controlling the temperature of the reducing gas to the shaft furnace, means for cleaning, upgrading, and introducing spent top gas from the direct reduction furnace to the molten bath gasifier as a gaseous coolant to cool the reaction with the bath and reduce refractory wear within the gasifier.

4 Claims, 3 Drawing Figures 4,553,742

APPARATUS FOR GENERATING A REDUCING GAS

CROSS-REFERENCE TO RELATED APPLICATION

This is a division of application Ser. No. 556,502, filed Dec. 1, 1983, pending, which is a continuation-in-part of Ser. No. 360,713, filed Mar. 22, 1982, now abandoned.

BACKGROUND OF THE INVENTION

This invention concerns a method and apparatus for generating a low-sulfur reducing gas by the gasification of carbonaceous fuel in a molten iron bath. Fuel, oxygen and a slag former are injected into the molten metal bath through the bottom of the bath-containing vessel. The reaction within the vessel is cooled by the injection of a gaseous coolant which is recycled spent top gas from a direct reduction furnace, steam or a mixture thereof.

The present invention is an improvement to German OLS No. 27 50 275, which teaches the generation of a reducing gas in a molten metal bath. The known gasifier is noted for its refractory wear. The present invention alleviates the refractory wear problem by maintaining the bath temperature of the gasifier at a lower level. This is achieved by injecting a coolant into the molten metal bath to cool the reaction.

Sanzenbacher et al. U.S. Pat. No. 4,238,226 and Scarlett et al. U.S. Pat. No. 4,248,626 both describe methods for producing gas for direct reduction and the melting of direct reduced iron in a chamber containing a molten metal bath. No coolant is used in either of these processes because the melting of the direct reduced iron maintains the temperature of the molten metal bath in the desired range.

The present invention also provides a well-balanced reducing gas for the direct reduction of iron. This is achieved by maintaining the operating temperature of the molten bath gasifier above the iron-carbon eutectic point.

In the direct reduction of iron oxide to metallized iron in a shaft furnace, the reacted top gas is superheated and must be cooled immediately upon removal from the furnace. The present invention utilizes this superheat to calcine lime for sulfur removal from the shaft furnace.

OBJECTS OF THE INVENTION

It is the principal object of this invention to provide and apparatus for generating a reducing gas in a molten metal bath, in cooperation with a shaft furnace for the direct reduction of iron oxide to metallized iron.

It also an object to provide a process that is highly efficient and results in a substantially sulfur-free metallized iron as well as a substantially sulfur-free spent top gas.

BRIEF DESCRIPTION OF THE DRAWINGS

This invention is better understood by referring to the following detailed description and the appended drawings in which.

DETAILED DESCRIPTION

Figure 1:
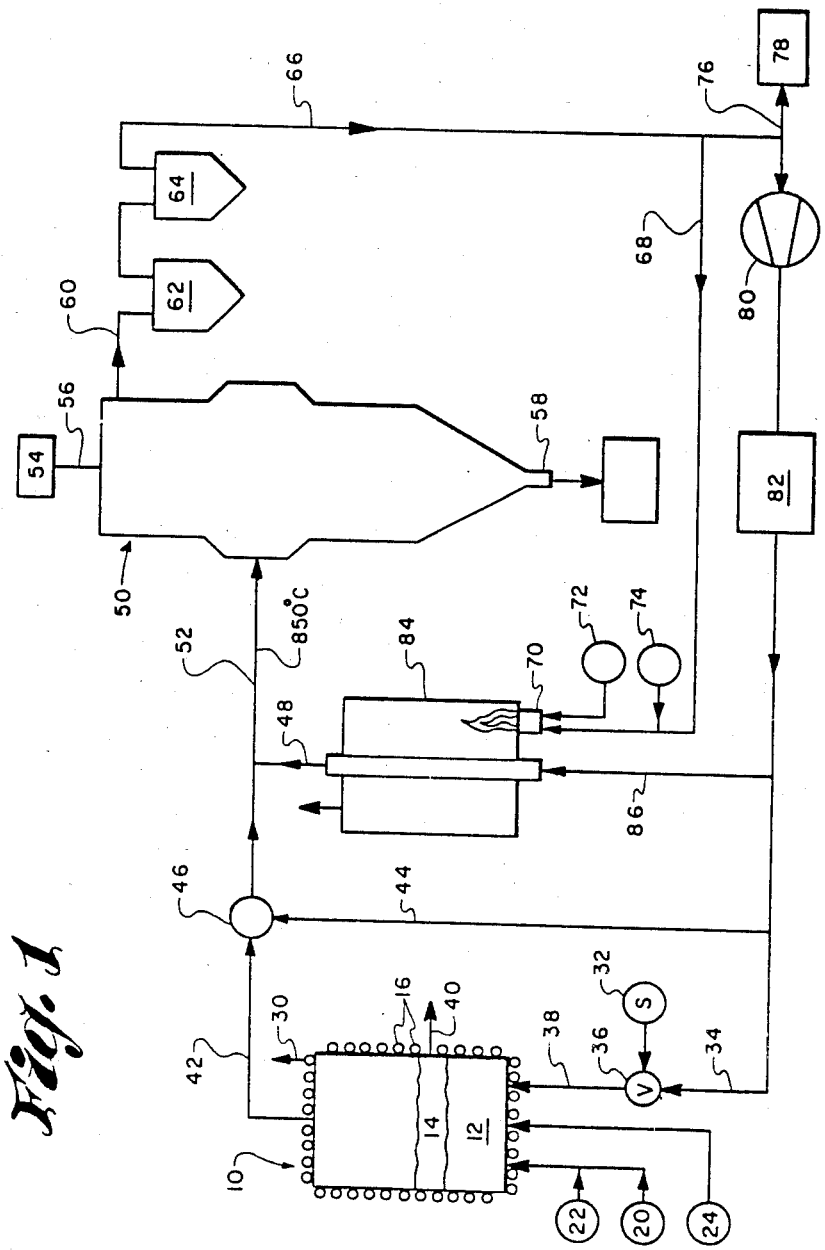
FIG. 1 is a schematic diagram of a preferred embodiment of the invention showing a molten bath gasifier for supplying reducing gas to a shaft furnace and the necessary auxiliary equipment.

Referring now to FIG. 1, a molten bath gasifier 10 contains a molten iron bath 12 and a fluid slag 14. Cooling coils 16 surround the gasifier; fuel such as coal from source 20 is injected into the bath through the bottom of the gasifier. A flux such as lime from source 22 is injected into the bath as needed to adjust the fluidity of the slag and to assist in sulfur removal. The slag is a mixture of molten ash, lime and magnesia from the flux, refractory lining material, calcium sulfide from the reaction of sulfur in the fuel with lime, and FeO in equilibrium with the molten iron bath. Oxygen from source 24 is also injected into the bath through the bottom of the gasifier to oxidize and gasify the fuel to carbon monoxide.

Suitable fuels are coal, a hydrocarbon, charcoal, coke oven gas, or mixtures thereof. The preferred fuel is powdered coal.

External cooling of the gasifier is provided by coils 16. Water from source 28 passes through the coils and emerges as steam from line 30. It is desired to maintain the operating temperature of the gasifier at about 1500° C. Steam from source 32 or carbon dioxide-lean top gas from line 34 or a combination controlled by valve 36 are injected into the molten bath through line 38. The temperature of the bath is monitored by a device (not shown) which controls the operation of valve 36 and thus the injection of steam and/or cleaned top gas.

Molten slag 14 is removed from the gasifier at outlet 40 as required. Hot partial oxidation gas (reducing gas) is removed from gasifier 10 through line 42 after which it is tempered or quenched to a temperature below slag fusion temperature by carbon dioxide-lean top gas from line 44 in quencher 46. Heated carbon dioxide-lean top gas from line 48 is added to the quenched reducing gas and the resulting mixture is introduced to direct reduction furnace 50 through line 52. Iron oxide from bin 54 is fed into furnace 50 through line 56 to form a packed bed burden therein. The downwardly moving iron oxide burden is reduced to metallized iron by countercurrent flow of the reducing gas. Metallized iron is removed at outlet 58 from the furnace and spent top gas is removed from the furnace via line 60. If desired, lime or limestone may be fed to the furnace through line 56 to form a part of the descending burden. The heat in the spent top gas will calcine the lime. If there is any appreciable sulfur in the reducing gas, it will combine with the calcium as calcium sulfide which is removed with the metallized iron along with any unreacted calcium oxide through discharge pipe 58. This will prevent contamination of the direct reduced iron with sulfide as well as preventing contamination of the spent top gas.

Because of thermodynamic restrictions, not all of the hydrogen and carbon monoxide in the reducing gas will react with the iron oxide, thus the spent top gas remove through line 60 contains valuable hydrogen and carbon monoxide. The spent top gas is passed through cooler 62 and scrubber 64 to reduce the gas temperature and remove water and dust from the gas. A portion of the cleaned, cooled top gas passes through lines 66 and 69 to be used as fuel for burner 70. Combustion air is provided from source 72 and additional fuel may be injected from source 74 if necessary for proper operation of burner 70. If it is desired to produce export fuel for other processes, such export fuel may be withdrawn from line 66 through line 76 and stored in tank 78.

The major portion of the spent top gas from line 66 is compressed in compressor 80, then cleaned of carbon dioxide in an acid gas removal system 82. The resulting $CO_2$-lean top gas is used in three ways, first to cool the molten metal bath through lines 34 and 38; second, to temper the gasified reducing gas through line 44; and third, to be introduced to heater 84 through line 86 to be re-heated for controlling the temperature of the reducing gas in line 52.

In operation, the temperature of the molten metal bath is maintained at a desired operating temperature of between 1350° and 1600° C., preferably about 1500° C. The slag layer is adjusted to be molten at the operating temperature range of between 1350° and 1600° C. This is accomplished by maintaining a proper basicity ratio in the slag. Basicity ratio is the ratio of CaO to $SiO_2$, or is sometimes expressed as the ratio of CaO plus MgO to $SiO_2$ plus $Al_2O_3$. Since MgO and $Al_2O_3$ are only present in small quantities, the former ratio is most often used. The temperature of the reducing gas in line 52 is maintained between 800° and 900° C., and preferably at a temperature of about 850° C. to provide a reducing gas which will react with the iron oxide burden, but will not melt the metallized iron product.

The molten metal layer consists substantially of iron, with about 1.5% to about 4.5% carbon, small quantities of phosphorus and silicon, and small quantities of other metallic components from the slag.

Coal entering the molten metal bath is devolatilized in both the gas and bath phases, carbon remaining in the bath, but hydrogen being vaporized out from the volatiles in the coal. Oxygen reacts with the carbon in the bath in both the coal phase and the bath phase, with some carbon being dissolved in the bath. No carbon compounds are driven off from the bath. The amount of oxygen injected into the bath is adjusted to react with the fixed carbon in the coal in a barely sufficient amount to form carbon monoxide. This reaction will continue to generate heat above 1600° C. Any gas with sensible heat capability will cool the bath. Such gases are hydrogen, carbon monoxide, carbon dioxide, and steam. Carbon dioxide and steam will also react with the carbon in the bath.

The heat of reforming is endothermic. The following reforming reactions show why the gas injections cool:

|  | HEAT OF REACTION |
|---|---|
| $H_2O + CH_4 \rightarrow CO + 3H_2$ | 2418 kCal/NCM of $CH_4$ |
| $CO_2 + CH_4 \rightarrow 2CO + 2H_2$ | 2716 kCal/NCM of $CH_4$ |
| $CO_2 + C \rightarrow 2CO$ | 1728 kCal/NCM of $CO_2$ |
| $H_2O + C \rightarrow CO + H_2$ | 1430 kCal/NCM of $H_2O$ |

In order to determine the amount of carrier gas needed to convey particulate coal in comparison to the amount of gas needed to act as coolant, a computer simulation was made. Solids can be carried in the dense phase when the solids to gas ratio is over 50 kg/kg of carrier gas. This is equivalent to about 64 kg of coal per normal cubic meter of gas. Testing systems for carrying coal typically utilize coal to gas rates of about 25 to 30 kg/NCM. In the computer simulation, when nitrogen is utilized to carry the coal at the rate of 28.4 kg/NCM, steam is required for cooling the molten bath at the rate of 6.09 kg of coal per NCM of steam. When humidified, carbon dioxide lean top gas is utilized as coolant, the coal to coolant rate is 1.77 kg,/NCM. Thus it is seen that coolant is required at rates far in excess of the carrying gas requirements.

Figure 2:
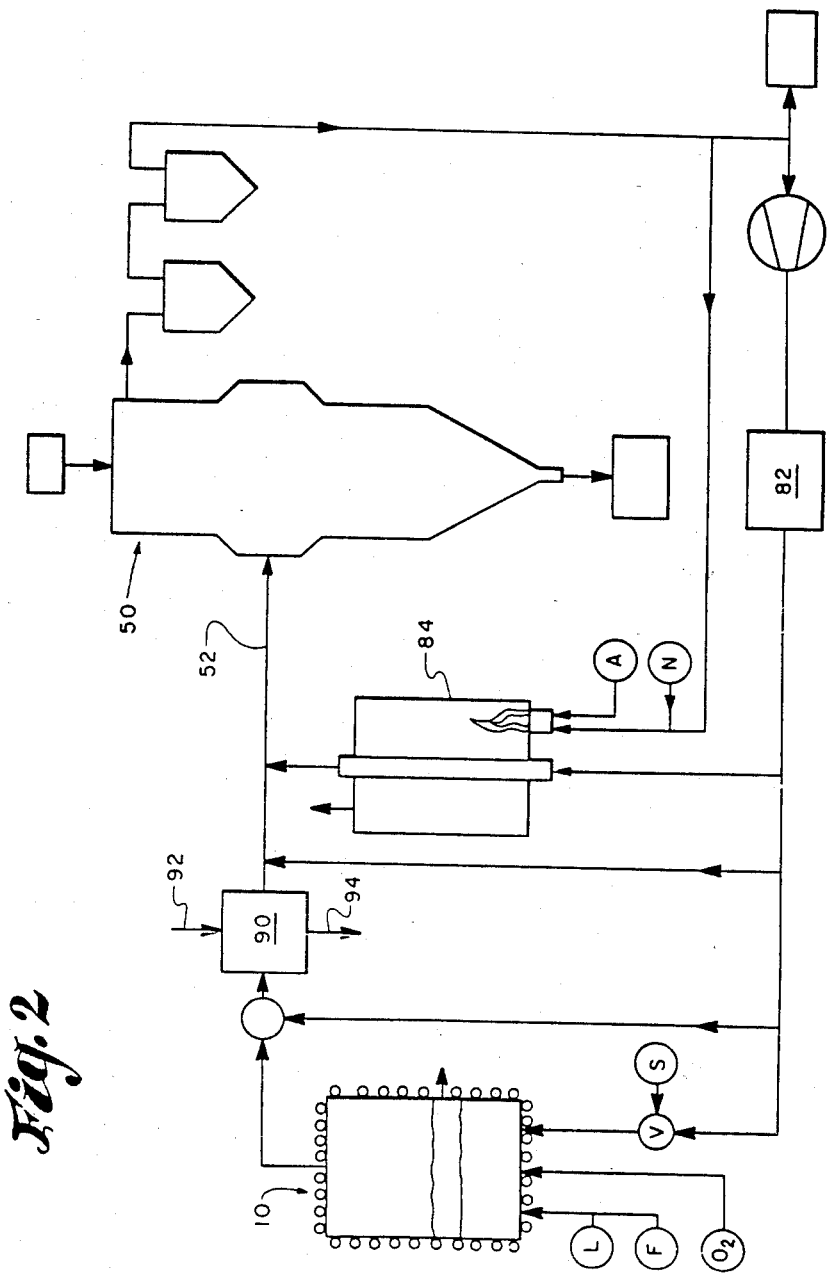
FIG. 2 is a schematic diagram similar to FIG. 1 showing an alternative flow sheet.

An alternative embodiment shown in FIG. 2 includes a sulfur removal system 90 into which calcium oxide is fed through line 92 and the reaction product, calcium sulfide, is removed through line 94. Thus, a substantially sulfur-free reducing gas is introduced to furnace 50 thorough line 52.

Figure 3:
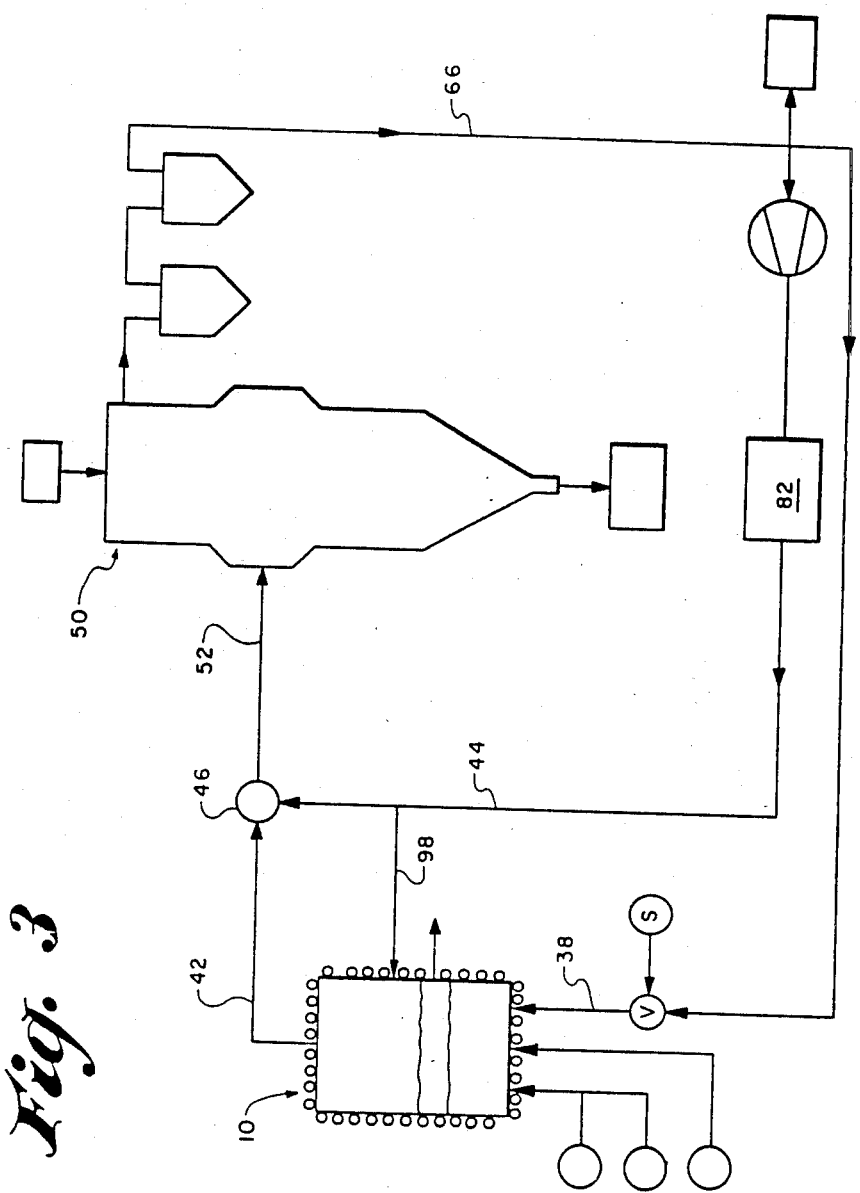
FIG. 3 is yet another alternative flow sheet for achieving the objects of the present invention.

In an alternative embodiment shown in FIG. 3, the coolant injected into gasifier 10 through line 38 is cleaned, cooled, spent top gas having the same composition as in line 66. The carbon dioxide removal system 82 provides fuel rich gas for line 44, a portion of which is injected into gasifier 10 above the molten metal bath through line 98. This provides a somewhat cooler reducing gas in line 42, being on the order of about 1500° C. This reducing gas is then reduced to a temperature of about 850° C. in quencher 46 prior to its injection into the direct reduction furnace 50.

SUMMARY OF THE ACHIEVEMENTS OF THE OBJECTS OF THE INVENTION

From the foregoing, it is readily apparent that we have developed an apparatus for generating a reducing gas in a molten metal bath, in cooperation with a shaft furnace for the direct reduction of iron oxide to metallized iron. The process is highly efficient and results in a substantially sulfur-free metallized iron as well as a substantially sulfur-free spent top gas.

What is claimed is:

1. Apparatus for generating a reducing gas and reducing iron oxide, said apparatus comprising:
    (a) a molten bath gasifier for producing a gasifier gas, said gasifier containing a molten iron bath;
    (b) a generally vertical shaft furnace for the direct reduction of iron, said furnace having particle introducing means at the top thereof, particle removal means at the bottom thereof for establishing a descending burden therein, reducing gas introduction means between said particle introducing means and said particle removal means and a spent top gas outlet for removing spent top gas from the upper portion of said furnace;
    (c) a first conduit communicating with said gasifier and said reducing gas introduction means for removing reducing gas from said gasifier and introducing reducing gas to said shaft furnace;
    (d) means for cooling and cleaning said spent top gas removed from the upper portion of said shaft furnace;
    (e) a second conduit communicating between said spent gas outlet and said cooling and cleaning means;
    (f) acid gas removal means for removing $CO_2$ from said cleaned, cooled spent top gas;
    (g) a third conduit communicating with said spent top gas cooling and cleaning means and said acid gas removal means;
    (h) a fourth conduit communicating between said acid gas removal means and the bottom of said gasifier;
    (i) a fifth conduit communicating between said acid gas removal means and said first conduit;
    (j) a sixth conduit communicating between said acid gas removal means and said first conduit and having heating means therein;

(k) means for injecting solid fossil fuel into the bottom of said gasifier beneath the surface of said molten iron bath; and (l) means for injecting oxygen into said gasifier beneath the surface of said molten iron bath.

2. Apparatus according to claim 1 further comprising means for injecting a calcium-containing flux into said gasifier beneath the surface of said molten iron bath.

3. Apparatus according to claim 1 further comprising cooling means comprising cooling coils surrounding said molten bath gasifier.

4. Apparatus according to claim 1 further comprising gas storage means and a seventh conduit communicating between said third conduit and said gas storage means for removing and storing gas from said apparatus.

* * * * *